United States Patent [19]

Lembo et al.

[11] Patent Number: 5,402,259
[45] Date of Patent: Mar. 28, 1995

[54] LINEAR ELECTROABSORPTIVE MODULATOR AND RELATED METHOD OF ANALOG MODULATION OF AN OPTICAL CARRIER

[75] Inventors: Lawrence J. Lembo, Torrance; John C. Brock, Redondo Beach, both of Calif.

[73] Assignee: TRW Inc., Redondo Beach, Calif.

[21] Appl. No.: 54,661

[22] Filed: Apr. 23, 1993

[51] Int. Cl.$^6$ .............................................. G02B 6/10
[52] U.S. Cl. ................................ 359/245; 359/276; 359/284; 385/2
[58] Field of Search ............... 359/245, 248, 284, 285, 359/286, 276, 109, 173, 194; 385/1, 2, 4

[56] References Cited

U.S. PATENT DOCUMENTS

| | | | |
|---|---|---|---|
| 3,331,036 | 10/1964 | Colbow | 359/245 |
| 3,747,022 | 7/1973 | Nanamatsu et al. | 359/245 |
| 4,093,345 | 6/1978 | Logan et al. | 359/245 |
| 4,863,245 | 9/1989 | Roxlo | 359/245 |
| 5,249,243 | 9/1993 | Skeie | 359/245 |

FOREIGN PATENT DOCUMENTS

| | | | |
|---|---|---|---|
| 0369706 | 5/1990 | European Pat. Off. | 359/245 |
| 0034815 | 2/1990 | Japan | 359/245 |

OTHER PUBLICATIONS

Johnson, et al., Reduction of intermodulation distortion in interferometric optical modulators, *Optics Letters,* vol. 13, No.10, pp. 928–930 (Oct. 1988).

Skeie, et al., Linearization of Electro–Optic Modulators by a Cascade Coupling of Phase Modulating Electrodes, *Integrated Optical Circuits,* SPIE vol. 1583, pp. 153–164 (1991).

*Primary Examiner*—Joseph A. Popek
*Assistant Examiner*—Vu Le
*Attorney, Agent, or Firm*—Noel F. Heal; Sol L. Goldstein

[57] ABSTRACT

Apparatus, and a corresponding method for it use, for directly modulating an optical carrier with a radio-frequency (rf) electrical signal. A semiconductor electroabsorptive modulator is operated at an optical wavelength and electrical bias voltage carefully selected to provide a near-linear electrical-to-optical transfer characteristic and to keep rf insertion loss low. Further reduction of insertion loss is achieved by use of an extremely short device, or a single quantum well device configuration, or both. Linearity is further optimized by choosing an appropriate combination of optical polarization mode, optical reflectivity of the device facets, and the number and physical properties of multiple quantum wells.

22 Claims, 10 Drawing Sheets

LINEAR ELECTROABSORPTIVE MODULATOR AND RELATED METHOD OF ANALOG MODULATION OF AN OPTICAL CARRIER

BACKGROUND OF THE INVENTION

This invention relates generally to optical modulators and, more particularly, to techniques for modulation of an optical carrier with a radio-frequency communication signal. The benefits of optical transmission of high-frequency data over long-distance telecommunications systems are well established. Many of these benefits, such as immunity to electromagnetic interference, very wide bandwidth, and lightness of weight, would be of substantial value for short communication links as well, but are more difficult to obtain because of inherent inefficiencies of existing high-speed optical links.

Optical transmission of radio-frequency (rf) signals requires two major transducer components: an optical modulator to convert electrical rf signals to corresponding fluctuations in light intensity, and a demodulator, such as a photodiode, to convert the modulated optical carrier back into electrical rf signals. The invention is primarily concerned with the modulation process, wherein an electrical rf signal modulates the intensity of a light beam. In this description it will be understood that "light beam," "optical carrier" and similar terms are used to refer to radiation in the visible portion of the electromagnetic frequency spectrum, but that the principles of the invention also apply to radiation at frequencies outside the visible range, such as in the infrared or ultraviolet portions of the spectrum.

The invention is specifically concerned with optical modulation of the analog type. The modulating rf signal is continuously varying in amplitude and these variations are to be faithfully reproduced as corresponding variations in the intensity of the optical carrier. This is to be contrasted with digital optical modulation, wherein the modulating signals have only a small number of possible amplitude levels (usually two).

There are two major requirements for analog optical modulation. One is that the intensity variations in the optical signal must be a faithful reproduction of the original rf signal. In other words, the modulator must provide a linear relationship between its input and output signals. Changes in the electrical input signal are reflected in proportional changes in the optical output intensity. The other requirement is that the variations in optical intensity should be as strong as possible. If conversion of the rf signal to and from the optical form results in loss of rf signal amplitude, the electro-optical conversion components are said to result in rf insertion loss. Conventional electro-optical modulators, such as the Mach-Zehnder modulator, have a less than desirable performance in terms of both linearity and rf insertion loss. There is extensive literature on analog direct modulation using diode lasers, and analog external modulators based on interferometric approaches. Existing analog external modulators are large, and typically relatively narrow in bandwidth where greater linearity is desired, and are built with such materials and to such a physical scale that they are incompatible with integration into semiconductor substrates, such as substrates made from materials selected from Groups III–V of the periodic table.

Quantum-well electroabsorption modulators have been proposed for use as digital optical modulators. These devices are semiconductor waveguide devices whose light absorption properties at a given optical wavelength can be controlled by an electrical voltage applied to the waveguide section of the device.

It will be appreciated from the foregoing that there is a need for an optical modulator that is characterized by low rf insertion loss and low nonlinear distortion, i.e. a high degree of linearity. Such a modulator would be a key component for the efficient transmission of rf signals on optical carriers. The present invention satisfies this need.

SUMMARY OF THE INVENTION

The present invention resides in an electroabsorptive modulator for analog optical modulation, and in a related method of analog optical modulation. The electroabsorptive modulator of the invention can be designed to have both low radio-frequency (rf) insertion loss and a linear electrical-to-optical transfer characteristic over a useful voltage range. An important advantage of the electroabsorptive modulator over conventional electro-optical modulators is that the electroabsorptive modulator is extremely compact and is made using conventional semiconductor fabrication techniques. Therefore, it can be conveniently integrated with other semiconductor devices. For example, although the modulator is categorized as being "external," as contrasted with modulators that are electrically controlled lasers, an electroabsorptive modulator and a laser light source may be integrated into a single semiconductor chip.

Briefly, and in general terms, the apparatus of the invention may be defined as an analog optical modulation system, comprising a semiconductor electroabsorptive modulator, for producing an optical output that is intensity modulated in proportion to a varying input electrical signal; a laser light source having a wavelength selected to provide an approximately linear electrical-to-optical transfer characteristic for the electroabsorptive modulator; and a bias voltage source connected to the electroabsorptive modulator, providing a bias voltage selected to provide a linear electrical-to-optical transfer characteristic for the electroabsorptive modulator within an expected range of the input electrical signal. Physical characteristics of the electroabsorptive modulator, including its device length and quantum well configuration, are selected to maximize the optical intensity modulation of the modulator output, but without permitting too much light absorption under any input signal condition. The wavelength of the laser source is also selected to maximize the optical intensity modulation of the modulator output.

More specifically, the device length of the electroabsorptive modulator is made as short as possible, preferably one millimeter or less, minimize device insertion loss. It is also preferable that the electroabsorptive modulator has a single quantum well configuration, but multiple quantum wells may be used if the device length is made small enough. With appropriate design of the multiple quantum wells, linearity may be enhanced in comparison to the single quantum well configuration. Thus, both low insertion loss and enhanced linearity are obtained.

Even more specifically, the electrical input signal is a radio-frequency (rf) signal and the semiconductor electroabsorptive modulator produces an optical output that is intensity modulated in proportion to the rf input electrical signal. The apparatus further includes means for coupling the rf input signal to the electroabsorptive modulator, together with the bias voltage, wherein the rf input signal produces rf variations in the light absorption properties of the modulator. The physical characteristics of the electroabsorptive modulator, particularly its device length, are selected to minimize rf loss in the modulator output but without permitting too much light absorption under any input signal condition. The wavelength of the laser source is also selected to minimize rf loss in the modulator output.

The invention may also be defined in terms of a method for operating an electroabsorptive modulator to provide direct analog modulation of an optical carder with a radio-frequency (rf) input signal. The method comprises the steps of applying an input optical carrier to the modulator, the optical carrier having a wavelength selected to provide a near-linear region of an electrical-to-optical transfer characteristic; applying a bias voltage to the modulator, wherein the bias voltage is selected to operate the modulator in the near linear region of the transfer characteristic, and to provide a desirably high dynamic range; applying an rf input electrical signal to the modulator with the bias voltage, to vary the absorption properties of the modulator in proportion to the rf signal; and obtaining a modulator optical output signal that has been intensity modulated in proportion to the rf input signal.

The method may further comprise the steps of selecting the wavelength to minimize rf insertion loss due to the modulator, and selecting an electroabsorptive modulator to minimize rf loss in the modulator output, but without permitting too much light absorption under any input signal condition. The step of selecting an electroabsorptive modulator includes selecting an electroabsorptive modulator with a device length as short as possible, preferably less than one millimeter, and selecting an electroabsorptive modulator having a single quantum well configuration.

It will be appreciated from the foregoing that the present invention represents a significant advance in the field of electro-optical modulation. In particular, the invention provides for direct analog modulation of an optical carder, in an external modulator that provides substantial linearity and minimizes rf insertion loss. Because the modulator of the invention is fabricated as a semiconductor device, it can be conveniently integrated with other components, such as a laser light source, on a single semiconductor chip. Other aspects and advantages of the invention will become apparent from the following more detailed description, and the accompanying drawings.

DESCRIPTION OF THE PREFERRED EMBODIMENT

As shown in the drawings for purposes of illustration, the present invention is concerned with a technique for analog modulation of an optical carder with a varying electrical signal, typically a radio-frequency (rf) signal. Ideally, analog optical modulators should have a high degree of linearity and a low rf insertion loss.

In accordance with the present invention, an electroabsorption modulator is modified to operate as an analog optical modulator, having both good linearity, and therefore signal fidelity, and high efficiency, i.e. a low rf insertion loss. Moreover, the electroabsorptive modulator can be easily integrated with other semiconductor components, as needed, on a single chip. By way of further background, the ideal properties of an analog optical modulator will first be discussed.

Figure 1:
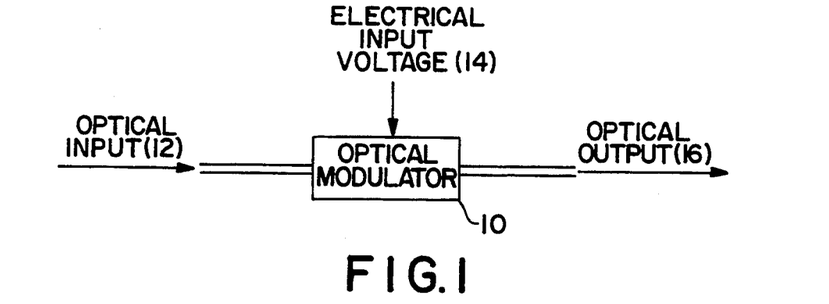
FIG. 1 is a diagram showing the function of an optical modulator.

FIG. 1 shows the function of an optical modulator, indicated by reference numeral 10. An optical input signal 12 is applied to the modulator 10 and is modulated in intensity by an electrical input voltage 14, resulting in a modulated optical output signal 16. An important property of the modulator is the electrical-to-optical transfer characteristic of the device, usually referred to simply as the transfer characteristic.

Figure 2A:
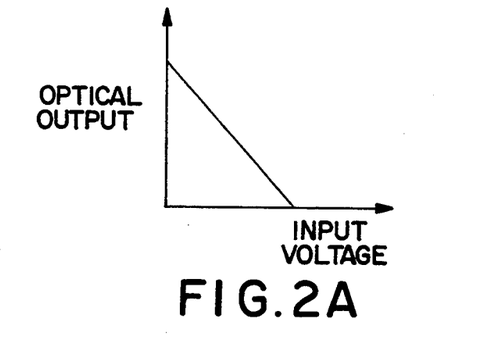
FIG. 2A is a graph of a perfectly linear optical modulator transfer characteristic.
Figure 2B:
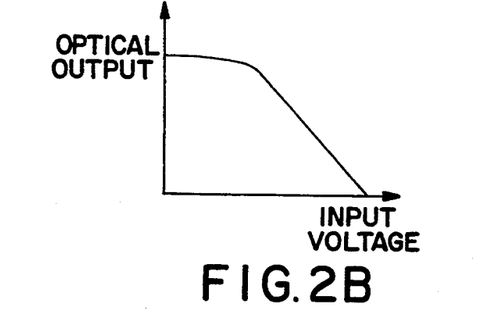
FIG. 2B is a graph of an optical modulator transfer characteristic that is approximately linear over part of its range.
Figure 2C:
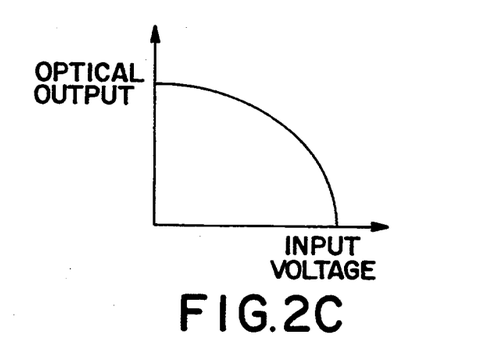
FIG. 2C is a graph of a nonlinear optical modulator transfer characteristic.

FIGS. 2A, 2B and 2C show-possible transfer characteristics in graphical form, FIG. 2A is an ideal, perfectly linear characteristic that would result in a linear, i.e. constant, relationship between the input electrical signal and the optical intensity modulator output. In practice, no device exhibits this ideal characteristic and an approximation is the usual goal. For example, FIG. 2B shows a transfer characteristic that is approximately linear over a wide voltage range, although not over the entire voltage range. This would be preferable to the characteristic of FIG. 2C, which nonlinear over its entire voltage range and would lead to distortion of the rf signal.

Figure 3:
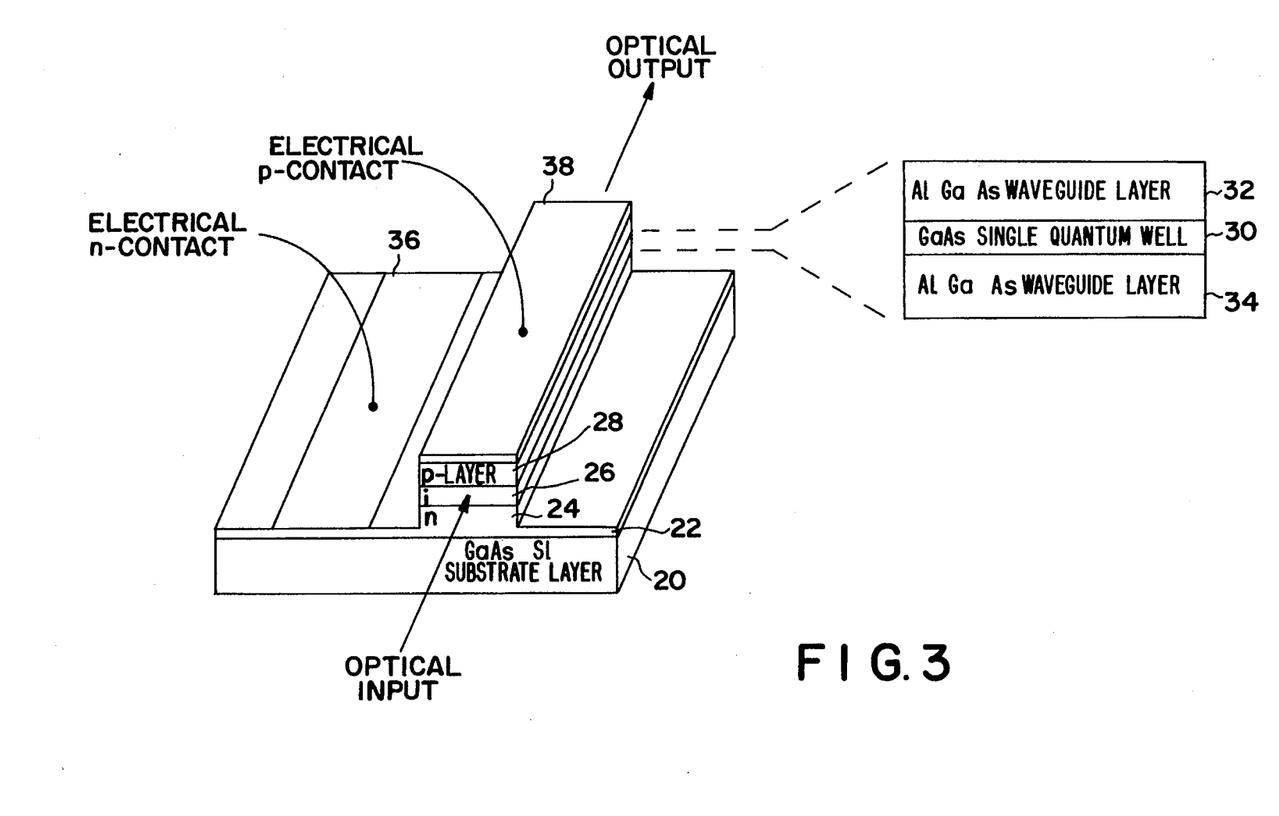
FIG. 3 is a diagrammatic view of an electroabsorptive optical modulator of the same general type used in the present invention.

FIG. 3 is diagrammatic view of a semiconductor electroabsorption modulator of the type preferred for use in the present invention. By careful selection of the structural features of the electroabsorption modulator, the desired properties of linearity and low rf insertion loss can be obtained. The preferred structure includes a semi-insulating (SI) substrate 20 of gallium arsenide (GaAs), on which is formed an n-type layer 22 having a raised mesa region, indicated at 24. Formed over the n-type mesa 24 is an intrinsic (i) region 26, and on top of the i region is a p-type layer 28. As indicated diagrammatically in the figure, the i region 26 includes single quantum well 30 of gallium arsenide (GaAs) formed between two waveguide layers 32 and 34 of aluminum gallium arsenide (AlGaAs). The percentage of aluminum in the waveguide layers 32 and 34 is graded from 30% at the quantum well interface to 60% at the n- and p-type layer, interfaces, to provide confinement of the optical field. The reflectivity of the end facets of the intrinsic region 26 is 30%, and the optical polarization is perpendicular to the plane of the modulator layers, i.e. TM polarization. The device also includes electrical contact layers 36 and 38, formed over the n-type layer 22 and the p-type layer 28, respectively.

Being an optoelectronic device, the modulator structure includes both electrical contacts (36 and 38) and optical input/output ports, which may be coupled to optical fibers, as will be discussed with reference to FIG. 4. Electrically, the device is a p-i-n structure, with electrical contacts being made to the p- and n-type layers. Application of a voltage to these contacts causes an electric field to appear in the intrinsic region 26, which acts as an optical waveguide for the light that is to be modulated. The substrate 20 is chosen to be of the semi-insulating (SI) type, so that the n- and p-type contacts may be placed in close proximity, and so that parasitic capacitance may be minimized. This structure allows the device to attain a very high speed, while not compromising the important properties of linearity and low rf insertion loss. The intrinsic region 26 comprises two layers (32 and 34) that confine the light, in between which is sandwiched the single quantum well layer 30. It is this layer that is responsible for the voltage-dependent absorption of light, and so is usually referred to as the "active" layer. Light absorption in the surrounding confinement layers is insignificant. By making the thickness of the single quantum well 30 small in comparison with the waveguide layers 32 and 34, one can keep the optical absorption down to an acceptable minimum. By operating at the proper wavelength, therefore, one can make the absorption of light in the active region highly sensitive to the applied electric field without incurring unacceptably high optical losses.

Figure 4:
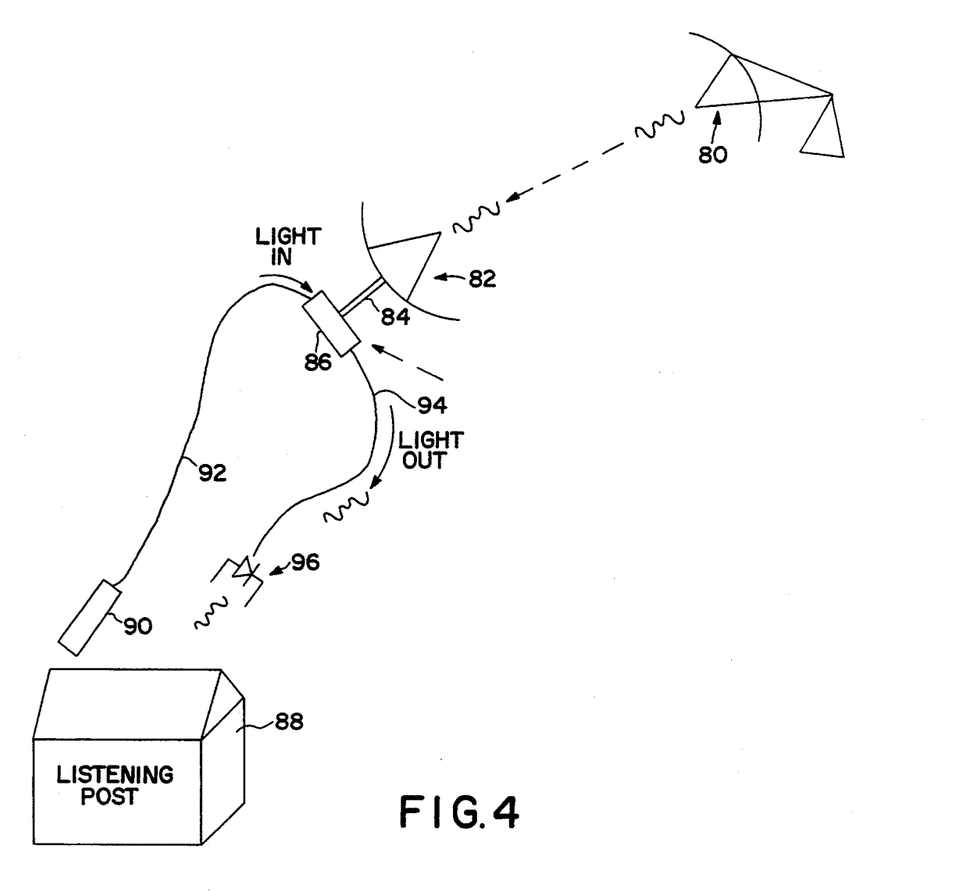
FIG. 4 is a diagrammatic view illustrating an application involving optical modulation in accordance with the invention.

FIG. 4 depicts an example of an application of the modulator of the invention. The application will serve to illustrate the importance of high linearity and low insertion loss as principal goals.

In the illustrated application, rf signals are transmitted from a transmitting antenna 80 to a receiving antenna 82, and then transmitted in electrical form over a short microwave waveguide or coaxial cable, indicated at 84, to an optical modulator 86. The receiving antenna 82 is assumed to be located in a remote region and it is necessary to transmit the received signals, without demodulation or down-conversion to a lower frequency, to a listening post 88. The remote location of the receiving antenna 82 and the high frequency of the received signals preclude the use of conventional electrical cables to transmit the signals to the listening post 88. Therefore, an optical communication link is used, including a laser light source 90 conveniently located at the listening post 88, an optical fiber 92 extending from the laser to the modulator 86, and another optical fiber 94 extending from the modulator back to the listening post 88, where a photodiode 96 demodulates the optical carrier and regenerates the received rf signal.

Figure 5A:
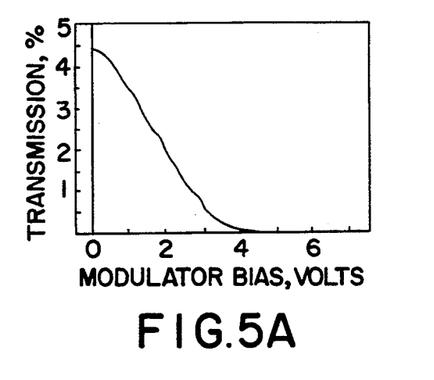
FIGS. 5A and 5B are graphs of the electroabsorptive optical modulator transfer characteristics for two separate wavelengths of operation.
Figure 5B:
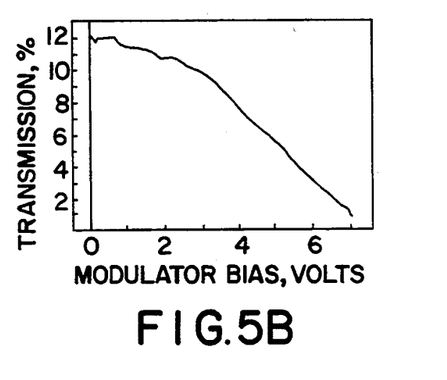

An important parameter affecting the linearity of the modulator is the wavelength of the light being modulated. Because the laser light source 90 is external to the modulator 86, the laser may be selected to be of a relatively noise-free design to enhance the dynamic range of the optical communication link. It may also be of relatively high power, to provide for rf gain for the optical communication link. Perhaps even more importantly, the frequency of the laser may be selected to provide a desired degree of linearity of the modulator 86. FIGS. 5A and 5B show the transfer characteristics of the modulator for light wavelengths of 800 nm (nanometers) and 810 nm, respectively. It will be appreciated that other parameters can affect linearity such as polarization and etalon effect. The characteristic of FIG. 5B exhibits approximate linearity over a voltage range of 3-6 volts, but the characteristic of FIG. 5A is largely nonlinear over its voltage range of 1-4 volts.

Although the theoretical basis for the wavelength dependence of the device is not completely understood, it is thought to be related to a combination of the transfer characteristic due to intrinsic material absorption in the electroabsorption device, and the transfer characteristic due to an etalon effect in the device, which has facets that have no antireflective coatings and behaves in a similar manner to a semiconductor laser cavity. Both the etalon effect and the intrinsic absorption effect are considered to be wavelength sensitive.

Figure 12A:
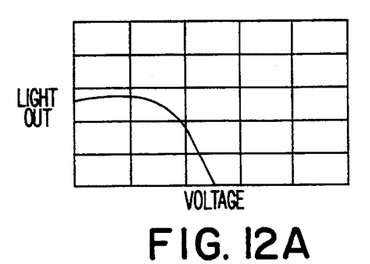
FIG. 12A is a graph showing the theoretical transfer characteristic of an electroabsorptive modulator due to intrinsic material absorption alone.
Figure 12B:
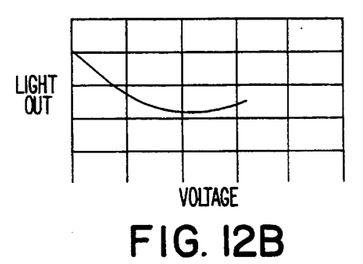
FIG. 12B is a graph showing the theoretical transfer characteristic of an electroabsorptive modulator due to etalon effect alone.
Figure 12C:
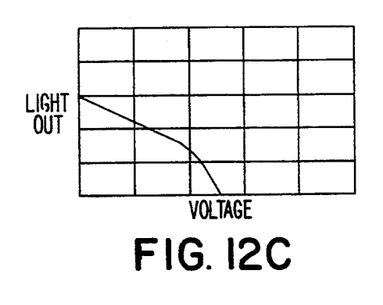
FIG. 12C is a graph showing the composite transfer characteristic obtained by combining the characteristics of FIGS. 12A and 12B.

FIG. 12A is a simulated transfer characteristic of an electroabsorptive modulator, due to intrinsic material absorption alone. The characteristic is linear only over a relatively small voltage range. FIG. 12B is the transfer characteristic due to the etalon effect alone. Both the etalon property and the intrinsic characteristic of FIG. 12A are wavelength sensitive. The linearity of the modulator may be controlled and improved by adjusting the Etalon transfer function, which in turn, depends upon the reflectivity of the modulator facets. With the wavelength properly adjusted, the etalon effect acting alone is linear over a small voltage range at low voltage. When the etalon effect and the intrinsic characteristic are combined, a transfer characteristic such as the one shown in FIG. 12C results. It will be observed that this characteristic is approximately linear over a greater voltage range than either of the other characteristics of FIGS. 12A and 12B.

Figure 12D:
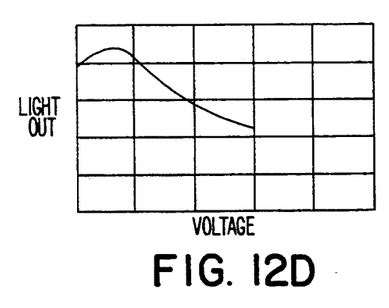
FIG. 12D is a graph similar to FIG. 12B, but using a different optical wavelength.
Figure 12E:
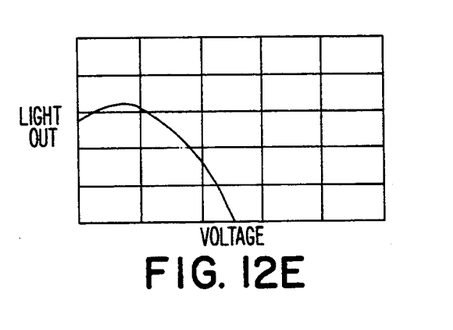
FIG. 12E is a graph similar to FIG. 12C, but combining the characteristics of FIGS. 12A and 12D, to illustrate that an improper choice of wavelength may not result in a linear composite characteristic.

In order to exploit the etalon effect for improved linearity, the optical wavelength must be chosen appropriately. The effect of not choosing the proper wavelength is shown in FIGS. 12D and 12E. FIG. 12D is a transfer characteristic similar to the one shown in FIG. 12, i.e. it is the transfer characteristic of the etalon effect alone, but using an optical wavelength slightly different from the one used in FIG. 12B. When the characteristic of FIG. 12D is combined with the intrinsic transfer characteristic of FIG. 12A, the composite characteristic of FIG. 12E results. It will be observed that the linearity is clearly inferior to that of the characteristic of FIG. 12C.

Figure 13A:
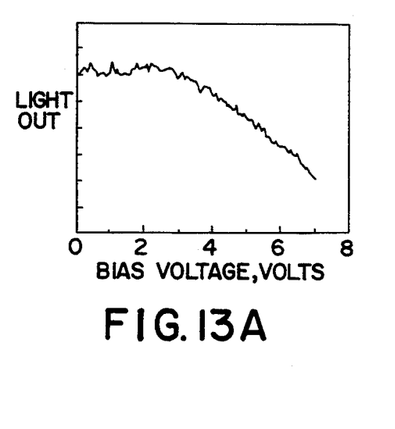
FIGS. 13A and 13B are transfer characteristics for the same electroabsorptive modulator but using different optical polarization modes.
Figure 13B:
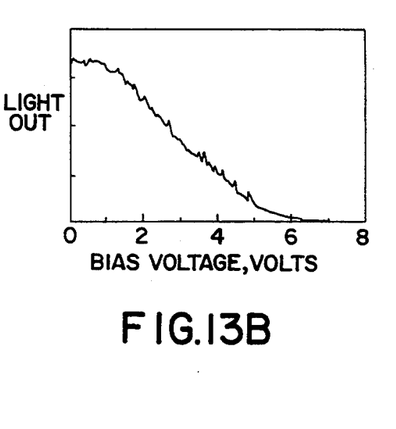

In addition to wavelength, optical polarization is another degree of freedom one can adjust to linearize the electrical-to-optical transfer function. It has been recognized previously that the transfer characteristic of Mach-Zehnder modulators is polarization sensitive, and that by choosing the proper polarization state the linearity of the transfer characteristic may be optimized. The same polarization sensitivity exists for the electroabsorption modulator and can, therefore, be exploited to optimize linearity. The polarization sensitivity is different for different wavelengths of operation, thereby providing yet additional degree of freedom. FIGS. 13A and 13B are experimentally obtained transfer characteristics for two different polarization modes. FIG. 13A is the characteristic for TM polarization, i.e. with the optical field perpendicular to the waveguide layers, and FIG. 13B is the characteristic for TE polarization. Both curves were obtained using an optical wavelength of 815 nanometers (nm). A relatively simple analytical treatment can be employed to predict the optimum polarization state with respect to linearity, given just these two curves (for any wavelength).

Figure 14:
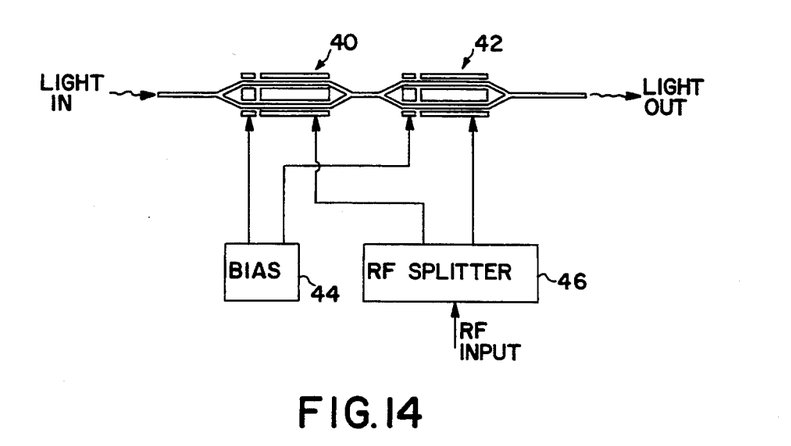
FIG. 14 is a diagram illustrating cascading of Mach-Zehnder modulators of the prior art.
Figure 15:
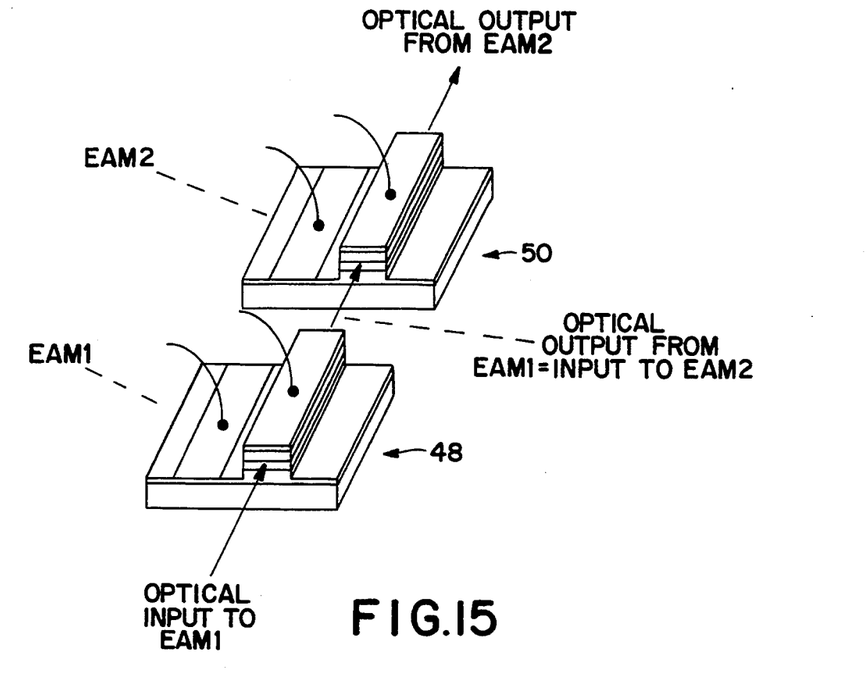
FIG. 15 is a simplified view of a pair of electroabsorptive modulators cascaded to enhance linearity of the transfer characteristic.

It is well known that cascading two Mach-Zehnder modulators results in a composite transfer characteristic that has a linearity superior to either modulator alone. Cascaded modulators of this type are available commercially but the additional complexity of their electrode structures limits their bandwidth to approximately 1 GHz (gigaHertz). FIG. 14 illustrates a cascaded pair of Mach-Zehnder modulators 40 and 42, showing a bias voltage source 44 and an rf splitter 46 for applying an rf signal to both modulators simultaneously. However, applying the cascading principle to electroabsorptive modulators produces enhanced linearity without the disadvantage of limited bandwidth. FIG. 15 shows a pair of cascaded electroabsorptive modulators 48 and 50. No bandwidth penalty is involved because the electrode structures of the electroabsorptive modulators remain uncomplicated.

Figure 6:
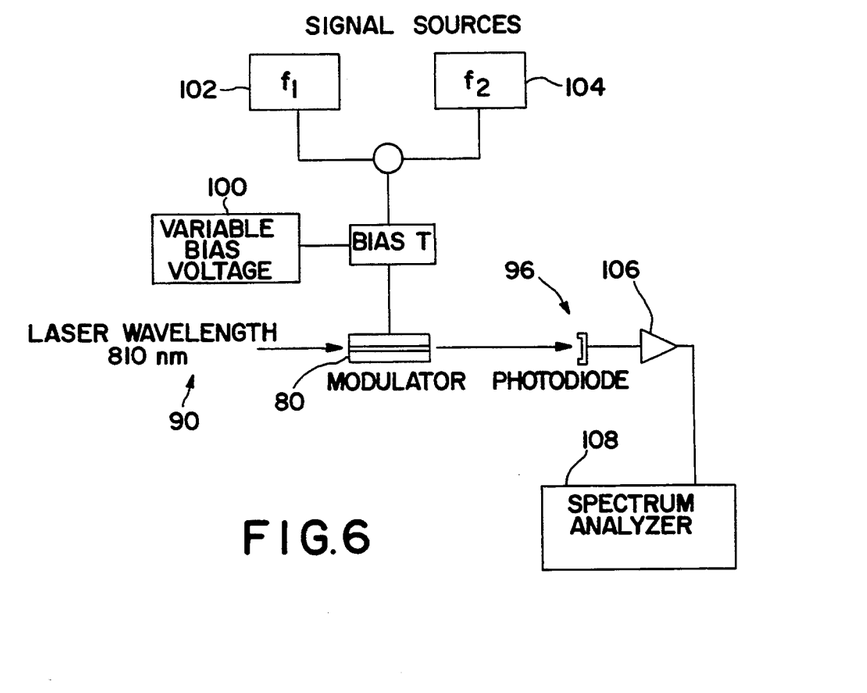
FIG. 6 is a block diagram of test apparatus for taking two-tone intermodulation measurements on an electroabsorptive optical modulator.
Figure 7A:
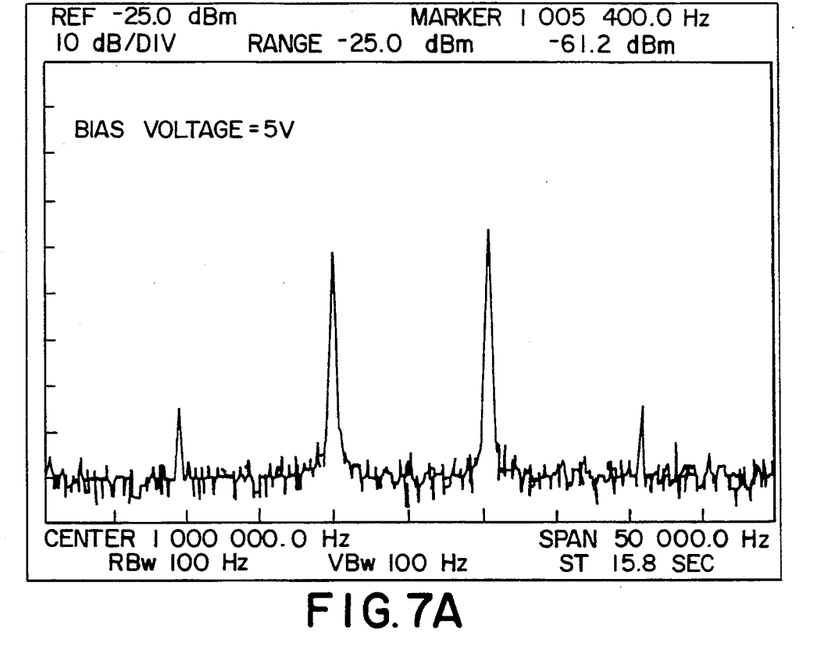
FIGS. 7A and 7B are graphs showing the frequency spectra obtained from two-tone intermodulation measurements taken with the apparatus of FIG. 6, using bias voltages of 5v and 4.5v, respectively.
Figure 7B:
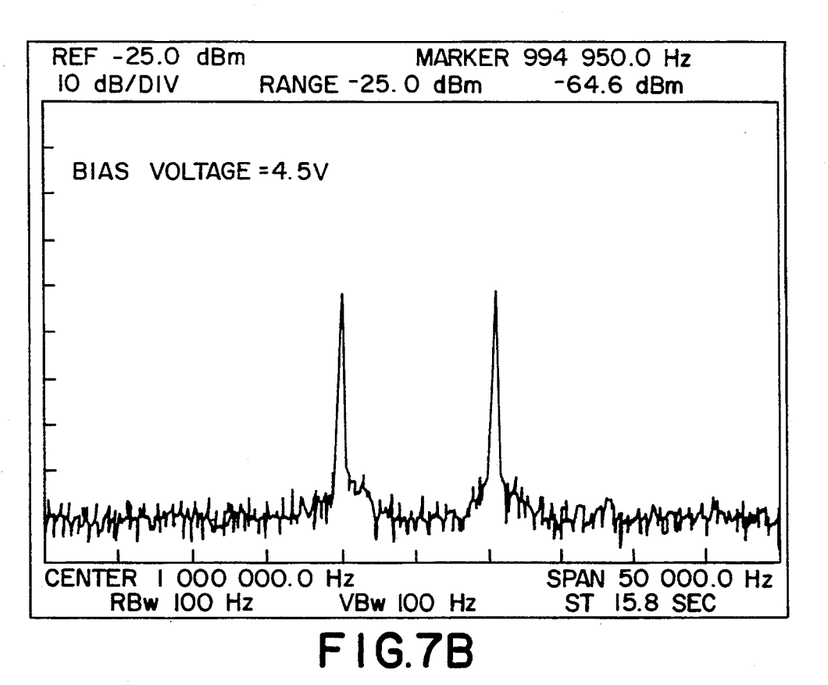

A quantitative measure of linearity may be obtained using a two-tone intermodulation test, using the apparatus illustrated in FIG. 6. The modulator 86 is biased to a voltage level determined by a variable bias source 100, and the bias value is added to two single-frequency signal sources 102 and 104, at frequencies $f_1$ and $f_2$, respectively. After demodulation in the photodiode 96, the resulting rf signals are amplified in amplifier 106 and fed to a spectrum analyzer 108. The spectrum analyzer output, using the 810 nm laser source is shown in FIGS. 7A and 7B for two different bias voltages: 5 volts and 4.5 volts. The spectrum in each case includes the expected peaks at frequencies $f_1$ and $f_2$. At a bias voltage of 5 volts there are also spurious peaks at frequencies $2f_1-f_2$ and $2f_2-f_1$. The spectrum analyzer also includes relatively uniformly distributed noise peaks of lower amplitude, due to noise in the analyzer and associated circuitry. The strength of the spurious intermodulation peaks quantifies the linearity of the modulator. Weak spurious peaks indicate good linearity. FIG. 7B, which shows that the spurious peaks have been reduced below the level of spectrum analyzer noise, indicates that appropriate selection of the bias voltage also has a significant effect on the modulator linearity.

Another measure of performance of the modulator is its dynamic range, which quantifies the ability of the modulator to handle both small and large signals. The dynamic range may be defined as:

$$DR = K \cdot RIN^{2/3},$$

where K is a measure of the upper end of the dynamic range (and is reduced by nonlinearities), and RIN is the relative intensity noise (assumed to be limited to the laser itself). For a laser operating at 810 nm wavelength, the value of K for a conventional Mach-Zehnder modulator is 2.5. For the device of the invention operating at the same wavelength, the value of K is sensitive to the bias voltage selected. For example:

K=0.6 for a bias voltage of 4v,

K>10 for a bias voltage of 4.5v,

K=3 for a bias voltage of 5v. Thus, the bias voltage may be selected to produce improved linearity performance (and higher dynamic range) than that of a conventional optical modulator.

Figure 8A:
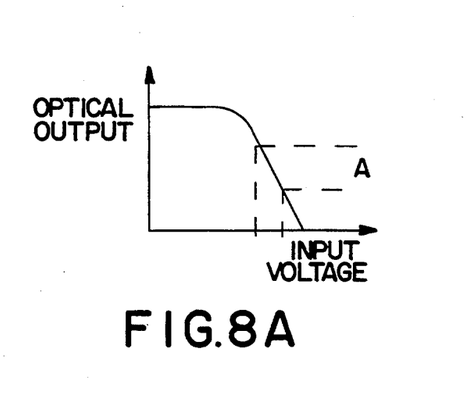
FIGS. 8A and 8B are exemplary graphs of electroabsorptive optical modulator transfer characteristics, having different slopes and switching voltages.
Figure 8B:
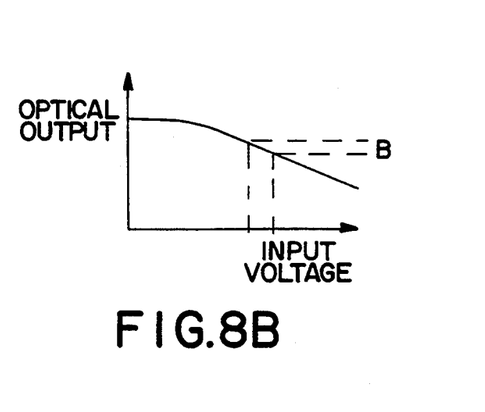

To achieve a high electrical-to-optical conversion efficiency, and low rf insertion loss, the slope of the transfer characteristic should be as large as possible. For example, FIG. 8A is an example of a linear transfer characteristic of relatively high slope, and FIG. 8B is an example of another linear transfer characteristic of lower, and less desirable slope. The same input voltage swing applied to both transfer characteristics results in a larger optical output signal in FIG. 8A than in FIG. 8B. Achieving a transfer characteristic like that in FIG. 8A is effected in part by the choice of wavelength, as illustrated in the absorption-wavelength characteristics of FIG. 9.

Figure 9:
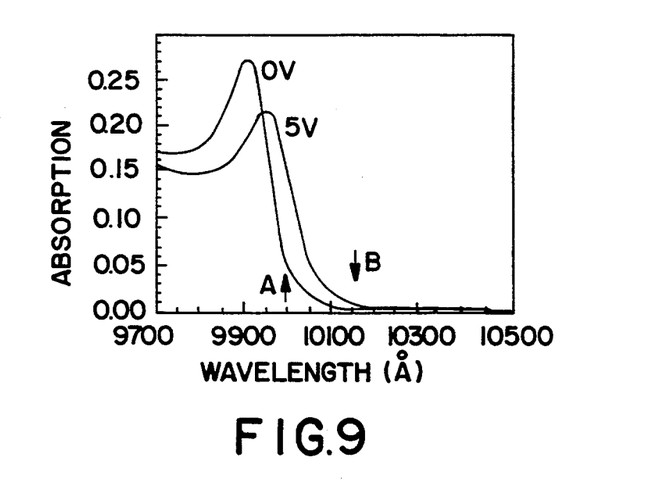
FIG. 9 is a graph showing variation of optical absorption with wavelength in an electroabsorptive optical modulator, for two different bias voltages.

The intrinsic absorption coefficient of the material of an electroabsorption modulator follows a curve shape commonly referred to as a lorentzian. For a given voltage applied to the modulator, the absorption first increases with wavelength, rising to a peak value, then decreases rapidly, then tapers off to near-zero at a very slow rate. The two curves plotted in FIG. 9 are for voltages of 0v and 5v, respectively, and it will be observed that, for a wavelength in the region indicated by A, a change in voltage from 0 to 5v results in a relatively large swing in absorption. However, in the wavelength region B the two curves almost converge and the same voltage change results in an imperceptible change in absorption.

A potential drawback to operating in the wavelength region A is that the absolute absorption values are relatively high, and much less light will be transmitted through the modulator, no matter what the voltage. To mitigate this difficulty, two design parameters of the modulator may be controlled. First, the length of the modulator should be kept small, to minimize the overall absorption of light by the device. Second, a single quantum well (SQW) configuration will absorb less light than a multiple quantum well (MQW) configuration.

Significantly, these recommendations for length and quantum well configuration are opposite to those best selected for digital modulation using a similar device. For digital modulation, the most important consideration is to optimize the so-called "contrast ratio" between its two modes of operation. A high overall absorption is favored for digital modulators in an "off" state, so relatively long devices are recommended, and usually the multiple quantum well configuration is recommended.

Figure 10A:
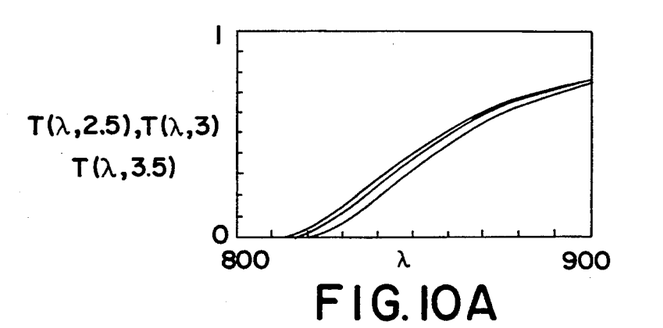
FIG. 10A is a graph showing the variation of optical transmission with wavelength in an electroabsorptive optical modulator, for three different bias voltages, wherein the modulator has either a multiple quantum well configuration or a large device length, or both.
Figure 10B:
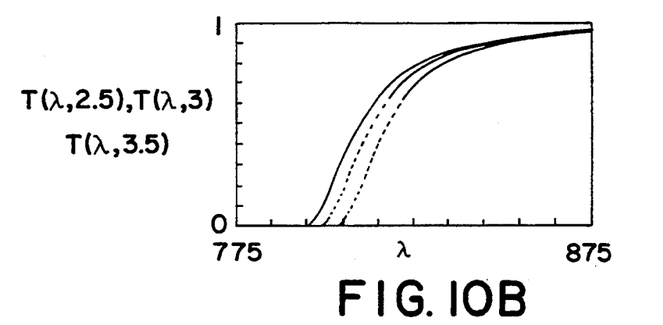
FIG. 10B is a graph similar to FIG. 10A, wherein the modulator has either a single quantum well configuration or a short device length, or both.

FIGS. 10A and 10B illustrate the effect of device length and quantum mode configuration on modulator transmission. Both figures plot modulator transmission versus wavelength for three different bias voltages: 2.5v, 3v and 3.5v. FIG. 10A is for a device having high optical mode confinement, i.e. multiple quantum wells, or a long device, or both. FIG. 10B is for a device having low optical mode confinement, i.e. a single quantum well, or a short device, or both. In FIG. 10B, the characteristic curves for the three bias voltages are steeper and further separated than in FIG. 10A. Thus, for a given voltage swing, such as between 2.5v and 3.5v, there is a greater corresponding swing in transmission in the FIG. 10B case. This illustrates the desirability of a short device length and single quantum well configuration.

Figure 11:
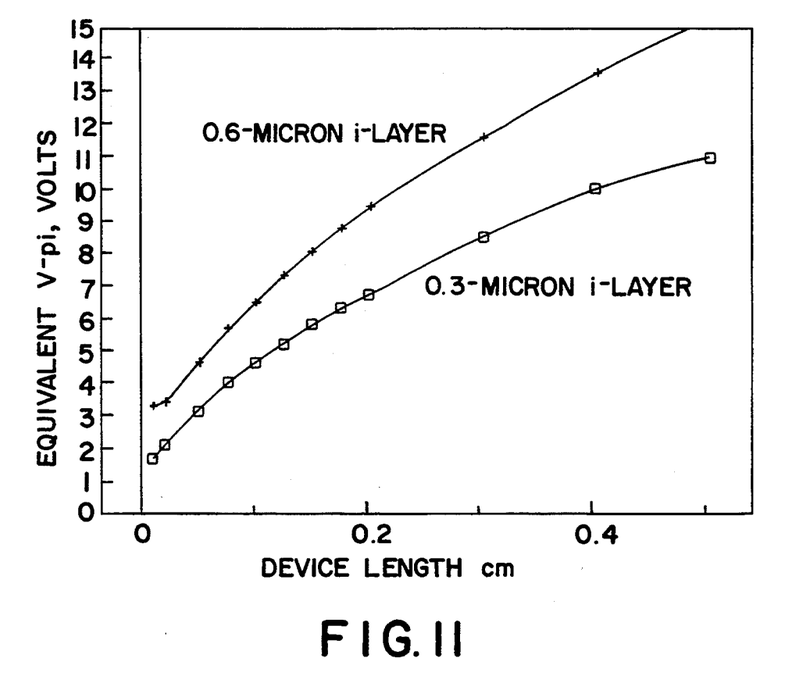
FIG. 11 is a graph showing the variation with device length of the equivalent switching voltage of an electroabsorptive optical modulator.

Another illustration of the effect of device length is provided by FIG. 11, which plots the equivalent switching voltage of the modulator as it varies with device length. An experimental device was constructed with a device length of 1 mm (millimeter) and a switching voltage of about 7v. The curves, which are the result of simulation studies, suggest that decreasing the device length to about 200 microns (200 $\mu$m) will result in a switching voltage as low as 4v. Combining this modulator with a commercially available photodiode would result in an overall optical link gain of only −10dB, which is an acceptable level for many applications.

As noted above, both the device length and the quantum well configuration of the device affect the rf insertion loss of the device. A short device with a single quantum well has the lowest insertion loss. However, for an appropriately designed device multiple quantum wells may be used to enhance linearity. One can think of multiple quantum wells as a parallel combination of single quantum wells. Optical absorption in such a device is equivalent to the sum of the absorptions from each of the individual quantum wells. This is analogous to the effect of cascading multiple modulator devices, and linearity may be enhanced in both cases. Therefore, if an electroabsorptive device can be fabricated with a small device length, of say 100 microns, rf insertion loss can be kept acceptably low even if multiple quantum wells are used to enhance linearity.

Figure 16:
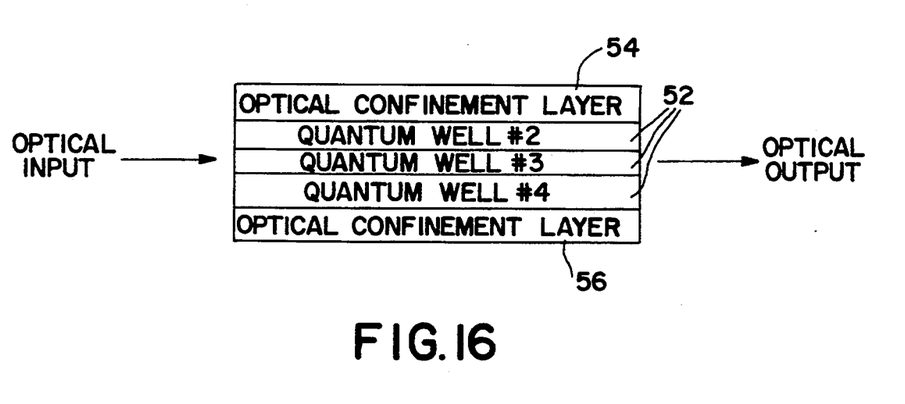
FIG. 16 is diagrammatic view of a multiple quantum well electroabsorptive modulator.

FIG. 16 is a diagrammatic representation of an electroabsorptive modulator having multiple quantum wells 52 formed between two optical confinement layers 54 and 56. In the device, the optical mode extends, to some extent, over the entire width of the waveguide, so that all of the quantum wells participate simultaneously in the absorption of light. The multiple quantum wells 52 are not necessarily identical, and may be varied in thickness and composition to obtain the optimum linear transfer characteristic.

It will be appreciated from the foregoing that the present invention represents a significant advance in the field of modulation of an optical carder with analog rf signals. In particular, the invention provides a device that is linear over a useful range of operation and has a low rf insertion loss. Another significant advantage over optical modulators of the Mach-Zehnder type is that, because of its short device length, the device does not require phase matching of electrical and optical signals, and consequently operates successfully over a much larger rf bandwidth. Further, the electroabsorptive modulator is extremely compact and can be conveniently integrated into semiconductor substrates, such as are used for high-speed electrical circuitry. Useful applications of the invention include CATV systems, antenna remoting in large personal communications networks, such as for satellite antenna feeds, entertainment distribution in passenger cabins of airliners, sensor fusion systems, virtual reality systems, optical interconnects for analog optical signal processing, and analog data links for sensing or monitoring systems.

It will also be appreciated that, although a specific embodiment of the invention has been described in detail by way of illustration, various modifications may be made without departing from the spirit and scope of the invention. Accordingly, the invention should not be limited except as by the appended claims.

We claim:

1. An analog optical modulation system, comprising:
   a semiconductor electroabsorptive modulator, for producing an optical output that is intensity modulated in proportion to a varying input electrical signal;
   a laser light source having a wavelength selected to provide an approximately linear electrical-to-optical transfer characteristic for the electroabsorptive modulator; and
   a bias voltage source connected to the electroabsorptive modulator, providing a bias voltage selected to provide a linear electrical-to-optical transfer characteristic for the electroabsorptive modulator within an expected range of the input electrical signal;
   and wherein the electroabsorptive modulator has a device length that is selected to maximize the optical intensity modulation of the modulator output but without permitting too much light absorption under any input signal condition.

2. An analog optical modulation system as defined in claim 1, wherein:
   the wavelength of the laser source is also selected to maximize the optical intensity modulation of the modulator output.

3. An analog optical modulation system as defined in claim 2, wherein:
   the device length of the electroabsorptive modulator is made as short as possible.

4. An analog optical modulation system as defined in claim 2, wherein:
   the device length of the electroabsorptive modulator is less than one millimeter.

5. An analog optical modulation system as defined in claim 1, wherein:

the electroabsorptive modulator has a single quantum well configuration, to further maximize the optical intensity modulation of the modulator output.

6. An analog optical modulation system as defined in claim 1, wherein:
the device length is in the order of 100 microns (micrometers), to keep rf insertion loss to a minimum; and
the electroabsorptive modulator has multiple quantum wells, to enhance the linearity of the modulator transfer characteristic.

7. An analog optical modulation system, comprising:
a semiconductor electroabsorptive modulator, for producing an optical output that is intensity modulated in proportion to a radio-frequency (rf) input electrical signal;
a laser light source having a wavelength selected to provide an approximately linear electrical-to-optical transfer characteristic for the electroabsorptive modulator;
a bias voltage source connected to the electroabsorptive modulator, providing a bias voltage selected to provide a linear electrical-to-optical transfer characteristic for the electroabsorptive modulator within an expected range of the input electrical signal; and
means for coupling an rf input signal to the electroabsorptive modulator, together with the bias voltage, wherein the rf input signal produces rf variations in the light absorption properties of the modulator;
and wherein device length of the electroabsorptive modulator is selected to minimize rf loss in the modulator output but without permitting too much light absorption under any input signal condition.

8. An analog optical modulation system as defined in claim 7, wherein:
the wavelength of the laser source is also selected to minimize rf loss in the modulator output.

9. An analog optical modulation system as defined in claim 8, wherein:
the device length of the electroabsorptive modulator is made as short as possible.

10. An analog optical modulation system as defined in claim 8, wherein:
the device length of the electroabsorptive modulator is less than one millimeter.

11. An analog optical modulation system as defined in claim 7, wherein:
the electroabsorptive modulator has a single quantum well configuration.

12. An analog optical modulation system as defined in claim 7, wherein:
the electroabsorptive modulator has multiple quantum wells, to further enhance device linearity.

13. An analog optical modulation system as defined in claim 7, wherein:
the system further comprises at least one additional electroabsorptive modulator coupled in cascade with the other one, to further enhance linearity.

14. An analog optical modulation system as defined in claim 7, wherein:
the optical polarization mode is selected to further enhance linearity.

15. A method for operating an electroabsorptive modulator to provide direct analog modulation of an optical carrier with a radio-frequency (rf) input signal, the method comprising the steps of:
applying an input optical carrier to the modulator, the optical carrier having a wavelength selected to provide a near-linear region of an electrical-to-optical transfer characteristic;
applying a bias voltage to the modulator, wherein the bias voltage is selected to operate the modulator in the near linear region of the transfer characteristic, and to provide a desirably high dynamic range;
applying an rf input electrical signal to the modulator with the bias voltage, to vary the absorption properties of the modulator in proportion to the rf signal; and
obtaining a modulator optical output signal that has been intensity modulated in proportion to the rf input signal.

16. A method as defined in claim 15, and further comprising:
selecting the wavelength of the optical carrier to minimize rf insertion loss due to the modulator.

17. A method as defined in claim 16, and further comprising:
selecting an electroabsorptive modulator to minimize rf loss in the modulator output but without permitting too much light absorption under any input signal condition.

18. A method as defined in claim 17, wherein the step of selecting an electroabsorptive modulator includes:
selecting an electroabsorptive modulator with a device length as short as possible.

19. A method as defined in claim 18, wherein:
the device length of the electroabsorptive modulator is less than one millimeter.

20. A method as defined in claim 17 wherein:
the electroabsorptive modulator has a single quantum well configuration.

21. A method as defined in claim 15, and further comprising:
choosing an optical polarization mode that further enhances the linearity of the transfer characteristic.

22. A method as defined in claim 15, and further comprising:
cascading the output of the modulator to the input of a second modulator of the same type, to further enhance the linearity of the transfer characteristic.

* * * * *